United States Patent
Wang et al.

(10) Patent No.: US 9,752,213 B2
(45) Date of Patent: Sep. 5, 2017

(54) METHOD FOR COMPREHENSIVELY RECOVERING RARE EARTH ELEMENTS AND FLUORINE ELEMENT IN A BASTNAESITE TREATMENT PROCESS

(71) Applicant: Grirem Advanced Materials Co., Ltd., Beijing (CN)

(72) Inventors: Liangshi Wang, Beijing (CN); Zhiqi Long, Beijing (CN); Dali Cui, Beijing (CN); Xiaowei Huang, Beijing (CN); Ying Yu, Beijing (CN); Yang Xu, Beijing (CN); Xingliang Feng, Beijing (CN)

(73) Assignee: GRIREM ADVANCED MATERIALS CO., LTD., Beijing (CN)

( * ) Notice: Subject to any disclaimer, the term of this patent is extended or adjusted under 35 U.S.C. 154(b) by 65 days.

(21) Appl. No.: 14/430,268

(22) PCT Filed: Sep. 29, 2013

(86) PCT No.: PCT/CN2013/084600
§ 371 (c)(1),
(2) Date: Mar. 23, 2015

(87) PCT Pub. No.: WO2014/048385
PCT Pub. Date: Apr. 3, 2014

(65) Prior Publication Data
US 2015/0252449 A1    Sep. 10, 2015

(30) Foreign Application Priority Data

Sep. 29, 2012 (CN) .......................... 2012 1 0375552

(51) Int. Cl.
C22B 59/00 (2006.01)
C22B 1/02 (2006.01)
C22B 3/10 (2006.01)

(52) U.S. Cl.
CPC ................ C22B 59/00 (2013.01); C22B 1/02 (2013.01); C22B 3/10 (2013.01); *Y02P 10/234* (2015.11)

(58) Field of Classification Search
CPC .............. C22B 59/00; C22B 3/10; C22B 1/02
USPC ....................................................... 423/21.1
See application file for complete search history.

(56) References Cited

U.S. PATENT DOCUMENTS 5,207,995 A    5/1993  Bosserman

FOREIGN PATENT DOCUMENTS

| CN | 1205363 A | 1/1999 |
| CN | 101683998 A | 3/2010 |
| CN | 101967555 A | 2/2011 |
| CN | 102399975 A | 4/2012 |

OTHER PUBLICATIONS

Translation of CN 102399975, Apr. 2012.*
Translation of CN 101683998, Mar. 2010.*

* cited by examiner

*Primary Examiner* — Steven Bos
(74) *Attorney, Agent, or Firm* — Shumaker, Loop & Kendrick, LLP; James D. Miller

(57) ABSTRACT

A method for comprehensively recovering rare earth elements and fluorine element in a bastnaesite treatment process. The method comprises: oxidation roasting a bastnaesite, and leaching a roasted mixture using a hydrochloric acid, adding a roasting promoter to the bastnaesite during the roasting process; and/or during the leaching process using the hydrochloric acid, adding a catalytic leaching promoter into the mixture, obtaining a rare earth chloride solution containing little cerium element and a cerium-rich residue containing the fluorine element; and separating and recovering rare earth fluorides from the cerium-rich residue.

18 Claims, No Drawings

METHOD FOR COMPREHENSIVELY RECOVERING RARE EARTH ELEMENTS AND FLUORINE ELEMENT IN A BASTNAESITE TREATMENT PROCESS

TECHNICAL FIELD

The present disclosure relates to the field of the rare earth hydrometallurgy, and more particularly to a method for comprehensively recovering rare earth elements and fluorine element in a bastnaesite treatment process.

BACKGROUND

As the largest rare earth mineral reserve in the world, bastnaesite is mostly exploited and utilized in the world. Bastnaesite provides almost 70% of rare earth raw materials, and abundant fluorine resource is contained in it. China, as a country rich in rare earths, has extremely abundant bastnaesite resources. For example, the Bayan Obo Mining District in Inner Mongolia, the Mianning rare earth mining district in Sichuan, the Weishan rare earth mining district in Shandong and the like, are all large rare earth deposits that mainly contain bastnaesite. The production of rare earth in China meets 95% of global demands of the rare earth. Bastnaesite in Sichuan is the second largest rare earth resource in China, and the history of smelting and separation of bastnaesite in Sichuan reaches 20-years. In the 1990s, Baotou mixed rare earth ore processing technology, including an oxidation roasting process and a sulfuric acid leaching process, was introduced in Sichuan; the bastnaesite is smelted to obtain a rare earth sulfate solution containing a fluorine element and a tetravalent cerium, then the obtained rare earth sulfate solution is subjected to double sulfate precipitation, an alkali treatment and dissolved with acid to extract rare earth chlorides rich in cerium and rare earth chlorides containing little cerium. This technology has a long process involving a dozen of solid-liquid separation processes, while the recovery rate of rare earths is only about 70%. An chemical method of oxidation roasting and hydrochloric acid leaching was successfully developed on the basis of the Mountain Pass rare earth mine smelting technology in 2000. The main processes of the chemical method include an oxidation roasting process, a hydrochloric acid leaching process, an alkali decomposition process and a process of leaching cerium using hydrochloric acid, and the chemical method can produce 98% of $CeO_2$ and rare earth chlorides containing little cerium. By using this method, 30~35% of REO (rare earth oxides) can be directly dissolved from minerals through the oxidation roasting process and the hydrochloric acid leaching process. Rare earth chlorides containing little cerium can be directly obtained, and the total recovery rate of rare earth is up to 93%. A great amount of high-value non-cerium rare earths enter a cerium-rich residue after the bastnaesite is processed using this method, leading to the under-priced use of high-value elements; for this reason, an alkali decomposition step, a washing step, a hydrochloric acid leaching step and the like need to be bridged. The comprehensive utilization of associated fluorine resources has never been realized during the treatment process of the bastnaesite; and the fluorine element enters the cerium-rich residue in the hydrochloric acid leaching process and then mostly enters wastewater along with the implementation of alkali conversion, thus increasing the difficulty of eliminating environmental pollution. Fluorine-containing wastewater is usually processed by using lime or calcium hydroxide; a great amount of calcium fluoride waste residue results from this process, thus increasing the difficulty of subsequent processing; Moreover, the effect of the fluorine removal from the wastewater is limited under a strongly basic condition, and the emission of the fluorine element contained in the wastewater hardly stably meets an emission standard (below 10 ppm), and this has become an environmental issue which hinders the development of rare earth industry in China, especially, in Sichuan.

Changchun Institute Of Applied Chemistry Chinese Academy Of Sciences, General Research Institute for Non-ferrous Metals and other research institutions have been making efforts in recent years to develop a green smelting technology to mainly realize the problem of comprehensive utilization of the elements of thorium and fluorine that are generated accompanying an extraction separation flow; according to the green technology, the tetravalent cerium, the thorium and the fluorine all enter a rare earth sulfate solution through an oxidation roasting process and a sulfuric acid leaching process, then the cerium, the thorium and the fluorine and other trivalent rare earth elements are separated and extracted from the rare earth sulfate solution with a one-step or multi-step extraction and separation technology; the core of the green technology is solving the comprehensive utilization of the fluorine and obtaining a pure thorium product by forming a cerium fluoride or a cryolite in the extraction and separation process. Although this technology has been industrially tested, the large-scale promotion and application of the new technology is limited for its high preliminary investment and high production cost, especially for the absence of the demand for the pure thorium, A bastnaesite decomposition method is disclosed in Chinese Patent Application No. 200610114588.9. According to the application, a bastnaesite and carbonates are mixed in such a proportion that the ratio of non-cerium rare earths contained in the bastnaesite to the cerium contained in carbonate is 1:0.5 to 1:2; the mixture is roasted; a great amount of cerium carbonate is added to solidify the fluorine contained in the bastnaesite, then, the cerium and non-cerium rare earth elements are separated by using an acid leaching method, and finally the fluorine is left in a cerium-rich residue in a solidified state. No fluorine is recovered in this technology. Besides, because of the input of a great amount of roasting promoters of rare earth carbonates, the workload of a mineral roasting processing, an acid dissolution processing, an extraction and separation processing and a rare earth precipitation processing are increased, and the consumption of the acid and the alkali is increased, leading to an increase in production cost.

A method for producing rare earth chlorides containing little cerium and cerium fluoride in one-step is disclosed in Chinese Patent Application 200810046146.4. According to the application, an oxidation roasted rare earth concentrate is selectively dissolved with dilute hydrochloric acid; then a strong oxidant like sulfuric acid, nitric acid, perchloric acid or potassium permanganate is added to perform a catalytic leaching process so that cerium reacts with fluorine ions to generate cerium fluoride, and the generated cerium fluoride enters a residue. This method omits an alkali conversion step, a washing step and a hydrochloric acid dissolution step; and inhibits or eliminates the water pollution that caused by the fluorine by solidifying the fluorine in the residue. However, the addition of the strong oxidant leads to the release of chlorine gas because of the oxidation of hydrochloric acid, resulting in environmental pollution which deteriorates production and operation conditions, a decrease in the amount of effectively used hydrochloric acid and an increase in the consumption of acid.

A method of activating, leaching and decomposing bastnaesite is disclosed in Chinese Patent Application 201010517433.6. According to the application, the bastnaesite is roasted and activated at a temperature below 400° C., and leached using hydrochloric acid and filtered. Then the filtrate is added with rare earth hydroxides to remove impurities, such as iron and thorium. As minerals are not completely decomposed after the bastnaesite is roasted at a low temperature, a leaching rate of rare earth is low, and although the fluoride content of the residue resulting from the leaching process is greater than 95%, the fluorides are all incompletely decomposed bastnaesite. Thus, the residue resulting from the leaching process is subjected to a sodium hydroxide alkali conversion processing, water washing in order to remove fluorine and dissolving with hydrochloric acid so as to recover rare earths; and it is needed to evaporate the fluorine-containing alkali liquid to recover the fluorine element. The whole process involves multiple solid-liquid separations; meanwhile, still using a technology consisting of the hydrochloric acid leaching process, the alkali conversion process and another hydrochloric acid leaching process. Hence, this method has problem of high chemical materials consumption, high energy consumption and high environment protection cost.

Foregoing technologies are advantaged in low investment and relatively low production cost, but disadvantaged in low purity of products and difficulties in recovering thorium and fluorine dispersed in the residue and wastewater, which lead to resources waste and environment pollution. With strengthening the protection of resources and environment, 'Emission Standards of Pollutants from Rare Earths Industry' was formulated by Ministry of Environmental production of the People's Republic of China and officially put into action on Oct. 1, 2011. The widely used technology, including a hydrochloric acid leaching process, an alkali conversion process and another hydrochloric acid leaching process can hardly meet the new environment protection requirement set forth in the new emission standards of pollutants from rare earths industry, and enterprises need to increase the investment on the environment protection facilities and the expense on environment protection processing.

Thus, it is urgently to develop a highly operable clean technology, and it is capable of comprehensively recovering the resource of rare earths and fluorine element with a simple technical flow at a low production cost.

SUMMARY

The present disclosure is intended to provide a method for comprehensively recovering rare earth elements and fluorine element in a bastnaesite treatment process, the method is advantaged in lowing production costs, increasing product value, shortening technical flow, lowering operation intensity and eliminating the emission of fluorine wastewater, and realizes the comprehensively utilization of fluorine resources and achieves the high recovery rate of rare earths, especially the high recovery rate of high-value non-cerium rare earths.

To achieve the purpose above, according to an aspect of the present disclosure, a method for recovering rare earth elements and fluorine element in bastnaesite treatment process is provided, including: oxidation roasting bastnaesite to obtain a roasted mixture, and leaching the roasted mixture with hydrochloric acid, adding a roasting promoter to the bastnaesite during the oxidation roasting; and/or during the leaching with hydrochloric acid, adding a catalytic leaching promoter into the mixture; obtaining a rare earth chloride solution containing little cerium element and a cerium-rich residue containing the fluorine element, and separating and recovering rare earth fluorides from the cerium-rich residue.

Further, in the method for recovering rare earth elements and fluorine element in a bastnaesite treatment process, the roasting promoter is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride.

Further, in the method for recovering rare earth elements and fluorine element in a bastnaesite treatment process, the roasting promoter is at least one of sodium sulfate, potassium sulfate, magnesium sulfate, ammonium sulfate, aluminum sulfate and rare earth sulfates, and preferably magnesium sulfate, aluminum sulfate and/or rare earth sulfates.

Further, in the method for recovering rare earth elements and fluorine element in a bastnaesite treatment process, the roasting promoter is at least one of ammonium ceric nitrate, cerium (IV) nitrate and cerium sulfate, and preferably cerium(IV) nitrate and/or cerium sulfate.

Further, in the method for recovering rare earth elements and fluorine element in a bastnaesite treatment process, the roasting promoter is at least one of aluminum nitrate, aluminum chloride and aluminum sulfate, and preferably aluminum nitrate and/or aluminum sulfate.

Further, in the method for recovering rare earth elements and fluorine element in a bastnaesite treatment process, the roasting promoter is at least one of sodium fluoride, potassium fluoride, ammonium fluoride and aluminum fluoride, and preferably sodium fluoride and/or aluminum fluoride.

Further, in the method for recovering rare earth elements and fluorine element in a bastnaesite treatment process, an amount of the roasting promoter is 0.01~5%, and preferably 0.1~3%, of a weight of the bastnaesite.

Further, in the method for recovering rare earth elements and fluorine element in a bastnaesite treatment process, the catalytic leaching promoter is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride. Further, in the method for recovering rare earth elements and fluorine element in a bastnaesite treatment process, the catalytic leaching promoter is at least one of sodium sulfate, potassium sulfate, magnesium sulfate, ammonium sulfate, aluminum sulfate and rare earth sulfates, and preferably at least one of magnesium sulfate, aluminum sulfate and rare earth sulfates.

Further, in the method for recovering rare earth elements and fluorine element in a bastnaesite treatment process, the catalytic leaching promoter is at least one of ammonium ceric nitrate, cerium(IV) nitrate and cerium sulfate, and preferably cerium(IV) nitrate and/or cerium sulfate.

Further, in the method for recovering rare earth elements and fluorine element in a bastnaesite treatment process, the catalytic leaching promoter is at least one of aluminum nitrate, aluminum chloride and aluminum sulfate, and preferably aluminum nitrate and/or aluminum sulfate.

Further, in the method for recovering rare earth elements and fluorine element in a bastnaesite treatment process, the catalytic leaching promoter is at least one of sodium fluoride, potassium fluoride, ammonium fluoride and aluminum fluoride, and preferably sodium fluoride and/or aluminum fluoride.

Further, in the method for recovering rare earth elements and fluorine element in a bastnaesite treatment process, an amount of the catalytic leaching promoter is 0.01~5%, and preferably 0.1~3%, of a weight of the bastnaesite.

Further, in the method for recovering rare earth elements and a fluorine element in a bastnaesite treatment process, the bastnaesite is oxidation roasted for 0.5~5 hr at a controlled temperature of 350~600° C., and preferably for 1~5 hr at a controlled temperature of 400~500° C.

Further, in the method for recovering rare earth elements and fluorine element in a bastnaesite treatment process, the leaching process using hydrochloric acid is carried out at 20~80° C., and preferably at 35~50° C.

According to another aspect of the present disclosure, a method for recovering rare earth elements and fluorine element in a bastnaesite treatment process is provided, including: leaching bastnaesite with hydrochloric acid; adding a catalytic leaching promoter during the leaching using hydrochloric acid; obtaining a rare earth chloride solution containing little cerium element and a cerium-rich residue containing the fluorine element and recovering rare earth fluorides from the cerium-rich residue containing the fluorine element.

Further, in the method for recovering rare earth elements and fluorine element in a bastnaesite treatment process, the catalytic leaching promoter is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride.

Further, in the method for recovering rare earth elements and fluorine element in a bastnaesite treatment process, the catalytic leaching promoter is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride.

Further, in the method for recovering rare earth elements and fluorine element in a bastnaesite treatment process, the catalytic leaching promoter is at least one of sodium sulfate, potassium sulfate, magnesium sulfate, ammonium sulfate, aluminum sulfate and rare earth sulfates, and preferably at least one of magnesium sulfate, aluminum sulfate and rare earth sulfates.

Further, in the method for recovering rare earth elements and fluorine element in a bastnaesite treatment process, the catalytic leaching promoter is at least one of ammonium ceric nitrate, cerium(IV) nitrate and cerium sulfate, and preferably cerium(IV) nitrate and/or cerium sulfate.

Further, in the method for recovering rare earth elements and fluorine element in a bastnaesite treatment process, the catalytic leaching promoter is at least one of aluminum nitrate, aluminum chloride and aluminum sulfate, and preferably aluminum nitrate and/or aluminum sulfate.

Further, in the method for recovering rare earth elements and fluorine element in a bastnaesite treatment process, the catalytic leaching promoter is at least one of sodium fluoride, potassium fluoride, ammonium fluoride and aluminum fluoride, and preferably sodium fluoride and/or aluminum fluoride.

Further, in the method for recovering rare earth elements and fluorine element in a bastnaesite treatment process, an amount of the catalytic leaching promoter is 0.01~5%, and preferably 0.1~3%, of a weight of the bastnaesite.

Further, in the method for recovering rare earth elements and fluorine element in a bastnaesite treatment process, the leaching process using hydrochloric acid is carried out at 80~250° C., and preferably at 100~200° C.

Compared with the current mainstream technology consisting of an oxidation roasting process, a hydrochloric acid leaching process, an alkali decomposition process and a leaching process of cerium using hydrochloric acid, the technical scheme provided herein can obtain a rare earth chloride solution containing little cerium and improve the leaching rate of rare earths from 35% to 70% and above. The leaching rate of the high-value non-cerium rare earths contained in the bastnaesite is up to 98% and above, without none of an alkali conversion processing, a washing processing and a hydrochloric acid dissolution processing for increasing the leaching rate of high-value non-cerium rare earths, Thus, the technology disclosed herein saves a great amount of chemical raw materials and reduces both environmental pollutions and production costs. Moreover, saving procedures such as multiple solid-liquid separations, the method disclosed herein simplifies a recycling flow, lowers operation intensity, reduces the loss of rare earths and improves the recovery rate of rare earths, especially the recovery rate of high-valence non-cerium rare earths. As no fluorine-containing wastewater is discharged during the whole process, the method has the characteristic of low energy consumption and creates considerable profits for enterprises; meanwhile, the method recovers the fluorine element contained in bastnaesite in the form of rare earth fluorides, thus realizes the comprehensive utilization of the fluorine resource.

Using a salt additive as a catalytic leaching promoter without introducing a strong oxidant such as sulfuric acid, nitric acid, perchloric acid or potassium permanganate, the method provided herein inhibits the deterioration of operation condition and the environmental pollution caused by the chlorine gas released from the oxidization of hydrochloric acid and other problems such as relatively high acid consumption; and by gathering the fluorine element contained in rare earth ore concentrate in the form of rare earth fluorides and separating the rare earth fluorides from a cerium-rich residue with cheap physical method based on the significant difference between physical characteristics of the rare earth fluorides and the cerium-rich residue and simply processing the separated rare earth fluorides into a polishing material, the method provided herein realizes the high-value utilization of the fluorine element and the cerium element.

The roasting promoter used in the present disclosure is more beneficial to strengthening the oxidation roasting of the bastnaesite, and reduces the roasting temperature, and promotes a related chain reaction (ripper effect) in the following leaching process.

DETAILED DESCRIPTION OF THE EMBODIMENTS

It should be noted that embodiments of the disclosure and the features thereof can be combined with each other if no conflict is caused. The present disclosure is described below in detail with reference to embodiments.

To adapt to market demands, a clean technology capable of recovering rare earth and fluorine resources is needed. The present disclosure provides a method for recovering rare earth elements and fluorine element in a bastnaesite treatment process, including: oxidation roasting bastnaesite to obtain a roasted mixture, leaching the roasted mixture with hydrochloric acid, adding a roasting promoter to the bastnaesite during the oxidation roasting and/or adding a catalytic leaching promoter into the mixture during the leaching with hydrochloric acid; obtaining a rare earth chloride solution containing little cerium element and a cerium-rich residue containing the fluorine element and separating and recovering rare earth fluorides from the cerium-rich residue containing the fluorine element.

In addition to the foregoing roasting process and leaching process by the acid, the method for recovering rare earth elements and fluorine element in a bastnaesite treatment process provided herein may further comprise other steps that are well known to those skilled in the art; the adoption of any step mentioned herein during the treatment process of a bastnaesite belongs to the protection scope of the present disclosure, and apparently, the method for recovering rare earth elements and fluorine element in a bastnaesite treatment process provided herein may include no other steps. In this case, in the method, a bastnaesite is oxidation roasted, a roasted mixture is leached using hydrochloric acid, a roasting promoter is added during the roasting process and/or a catalytic bleaching promoter is added into the mixture during the leaching process with hydrochloric acid to obtain a rare earth chloride solution containing little cerium element and a cerium-rich residue containing the fluorine element, and then rare earth fluorides are separated from the cerium-rich residue containing the fluorine element.

The roasting promoter and the catalytic leaching promoter applicable to the method provided herein are preferably, but not limited to, inorganic salt compounds, and in a preferred scheme, the roasting promoter and the catalytic leaching promoter are both inorganic salt compounds.

Preferably, the roasting promoter used in the method is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride.

More preferably, the roasting promoter used in the method is one of the four choices: (1) at least one of sodium sulfate, potassium sulfate, magnesium sulfate, ammonium sulfate, aluminum sulfate and rare earth sulfates, and preferably at least one of magnesium sulfate, aluminum sulfate and rare earth sulfates; (2) at least one of ammonium ceric nitrate, cerium(IV) nitrate and cerium sulfate, and preferably cerium (IV) nitrate and/or cerium sulfate; (3) at least one of aluminum nitrate, aluminum chloride and aluminum sulfate, and preferably aluminum nitrate and/or aluminum sulfate; (4) at least one of sodium fluoride, potassium fluoride, ammonium fluoride and aluminum fluoride, and preferably sodium fluoride and/or aluminum fluoride. When the roasting promoter contains a plurality of components, the plurality of components can be mixed in any proportion.

Still more preferably, an amount of the roasting promoter used in the method can be changed with an proportion of the cerium or fluorine contained in bastnaesite. For the sake of a convenient actual operation, the amount of the roasting promoter is converted into the mass percentage of the bastnaesite, the amount of the roasting promoter is preferably 0.01~5 wt %, and more preferably 0.1~3 wt % of the bastnaesite, converted into the mass percentage of the bastnaesite. The amount of the roasting promoter being in this range has an effect of activating minerals and improving the decomposition rate of minerals.

Preferably, in the method, the catalytic leaching promoter is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride.

More preferably, the catalytic leaching promoter used in the method is one of the four choices: (1) at least one of sodium sulfate, potassium sulfate, magnesium sulfate, ammonium sulfate, aluminum sulfate and rare earth sulfates, and preferably at least one of magnesium sulfate, aluminum sulfate and rare earth sulfates; (2) at least one of ammonium ceric nitrate, cerium(IV) nitrate and cerium sulfate, and preferably cerium(IV) nitrate and/or cerium sulfate; (3) at least one of aluminum nitrate, aluminum chloride and aluminum sulfate, and preferably aluminum nitrate and/or aluminum sulfate; (4) at least one of sodium fluoride, potassium fluoride, ammonium fluoride and aluminum fluoride, and preferably sodium fluoride and/or aluminum fluoride. When the catalytic leaching promoter contains a plurality of components, the plurality of components can be mixed in any proportion.

Still more preferably, in the method, the amount of the catalytic leaching promoter can be changed with an percentage of the cerium or fluorine contained in bastnaesite; and for the sake of a convenient actual operation, the amount of the catalytic leaching promoter is converted into the mass percentage of the bastnaesite, the amount of the catalytic leaching promoter is preferably 0.01~5 wt %, and more preferably 0.1~3 wt %, of the bastnaesite. When used in an amount within this range, the catalytic leaching promoter can form coordination ions with cerium ions, thorium ions, fluorine ions and the like in the bastnaesite to facilitate the leaching of fluorine, cerium and rare earths from minerals to form a chain reaction (ripple effect).

In the method provided herein, rare earth sulfates used in the roasting promoter and the catalytic leaching promoter is at least one of the sulfate of lanthanum (La), cerium (Ce), praseodymium (Pr), neodymium (Nd), promethium (Pm), samarium (Sm), europium (Eu) gadolinium (Gd), terbium (Tb), dysprosium (Dy), holmium (Ho), erbium (Er), thulium (Tm), ytterbium (Yb), lutetium (Lu), scandium (Sc) and yttrium (Y).

In the method provided herein, the effect of the roasting promoter lies in that the roasting promoter can infiltrate easily into the bastnaesite during the roasting process, and the effect makes minerals decomposed more thoroughly to facilitate the leaching of rare earths from raw materials during the leaching process using hydrochloric acid and improve the leaching rate of rare earths, especially the leaching of non-cerium rare earths with high-value.

Meanwhile, the mixture resulting from the roasting of the bastnaesite is usually a roasted rare earth concentrate (roasted ore), and the effect of the catalytic leaching promoter of an inorganic salt in the leaching process using hydrochloric acid is as follows:

In a case where the catalytic leaching promoter is a sulfate, the leaching of a tetravalent cerium is promoted by a complexation between the sulfate ions and the tetravalent cerium ions, the existence of the tetravalent cerium in leaching solution facilitates the leaching of the fluorine from minerals to form a $[CeF_x]^{4-x}$ complex, and the existence of fluorine ions in the leaching solution facilitates the leaching of the tetravalent cerium in turn, thus forming a chain reaction (ripple effect). The tetravalent cerium ion in the complex is slowly reduced into a trivalent cerium ion in the reductive condition of a hydrochloric acid system and finally formed into a cerium fluoride precipitate with the fluorine ion.

In a case where the catalytic leaching promoter is an inorganic salt containing a tetravalent cerium, the existence of the tetravalent cerium promotes the leaching of the fluorine from minerals to facilitate the leaching of rare earths, thus improving the leaching rate of rare earths, especially the leaching of high-value elements of non-cerium rare earths.

In a case where the catalytic leaching promoter is a inorganic salt containing the fluorine element, the existence of fluorine ions facilitates the leaching of tetravalent cerium to initiate a chain reaction (ripple effect) to promote the leaching of rare earths, the tetravalent cerium and the fluorine element, then a rare earth chloride solution containing little cerium element and a cerium-rich residue containing the fluorine element are obtained, and sequentially rare earth fluorides are separated and recovered from the cerium-rich residue.

In a case where the catalytic leaching promoter is an inorganic salt of aluminum, the existence of aluminum ions facilitates the leaching of fluorine ions, thus also initiating the foregoing chain reaction (ripple effect).

In the method provided herein, an oxidation roasting temperature of bastnaesite is preferably controlled at 200~600° C., including a temperature range of 200~349° C. and a temperature range of 350~600° C. A roasting time is 0.5~10 h, including a time range of 0.5~5 hr and a time range of more than 5 hr, but less than 10 h; preferably, the bastnaesite is oxidation roasted for 0.5~5 hr at a controlled temperature of 350~600° C., and preferably for 1~5 hr at a controlled temperature of 400~500° C.

In the method provided herein, rare earth fluorides may be separated from the cerium-rich residue containing the fluorine element with at least one of the following physical separation technologies: hydraulic cyclone separation, flotation and magnetic separation.

In the method provided herein, rare earth chlorides can be separated from the obtained rare earth chloride solution containing little cerium with solvent extraction separation method.

Meanwhile, to adapt to market demands, a clean roasting-free technology for recovering rare earth elements and fluorine resources is also provided in the present disclosure. The present disclosure provides a method for recovering rare earth elements and a fluorine element in a bastnaesite treatment process, including: leaching a bastnaesite with hydrochloric acid; adding a catalytic leaching promoter during the leaching process using by the hydrochloric acid, obtaining a rare earth chloride solution containing little cerium element and a cerium-rich residue containing the fluorine element and recovering rare earth fluorides from the cerium-rich residue containing the fluorine element.

Preferably, in the method, the catalytic leaching promoter used is at least one of sodium sulfate, potassium sulfate, magnesium sulfate, ammonium sulfate, aluminum sulfate, rare earth sulfates, ammonium ceric nitrate, cerium(IV) nitrate, aluminum nitrate, aluminum chloride, sodium fluoride, potassium fluoride, ammonium fluoride and aluminum fluoride.

More preferably, the catalytic leaching promoter used in the method is one of the four choices: (1) at least one of sodium sulfate, potassium sulfate, magnesium sulfate, ammonium sulfate, aluminum sulfate and rare earth sulfates, and preferably at least one of magnesium sulfate, aluminum sulfate and rare earth sulfates; (2) at least one of ammonium ceric nitrate, cerium(IV) nitrate and cerium sulfate, and preferably cerium(IV) nitrate and/or cerium sulfate; (3) at least one of aluminum nitrate, aluminum chloride and aluminum sulfate, and preferably aluminum nitrate and/or aluminum sulfate; (4) at least one of sodium fluoride, potassium fluoride, ammonium fluoride and aluminum fluoride, and preferably sodium fluoride and/or aluminum fluoride. When the catalytic leaching promoter contains a plurality of components, the plurality of components can be mixed in any proportion.

Still more preferably, in the method, an amount of the catalytic leaching promoter can be added according to a proportion of the cerium element or the fluorine element contained in the bastnaesite; and for the sake of a convenient actual operation, the amount of the catalytic leaching promoter is converted into the mass percentage of the bastnaesite, and the amount of the catalytic leaching promoter is preferably 0.01~5 wt %, and more preferably 0.1~3 wt %, of the bastnaesite. When used in an amount within this range, the catalytic leaching promoter can form coordination ions with cerium ions, thorium ions, fluorine ions and the like in the bastnaesite to facilitate the leaching of the fluorine, the cerium and rare earths from minerals to form a chain reaction (ripple effect).

In the method provided herein, the rare earth sulfates used in the roasting promoter and the catalytic leaching promoter is at least one of the sulfate of lanthanum (La), cerium (Ce), praseodymium (Pr), neodymium (Nd), promethium (Pm), samarium (Sm), europium (Eu) gadolinium (Gd), terbium (Tb), dysprosium (Dy), holmium (Ho), erbium (Er), thulium (Tm), ytterbium (Yb), lutetium (Lu), scandium (Sc) and yttrium (Y).

Meanwhile, in this method provided herein, the bastnaesite is unroasted, and the effect of the catalytic leaching promoter of an inorganic salt in the leaching process using hydrochloric acid is as follows:

In a case where the catalytic leaching promoter is a sulfate, the leaching of a tetravalent cerium is promoted by a complexation between sulfate ion and the tetravalent cerium ion, the existence of the tetravalent cerium in leaching solution facilitates the leaching of the fluorine element from minerals to form a $[CeF_x]^{4-x}$ complex, the existence of fluorine ions facilitates the leaching of the tetravalent cerium in turn, thus forming a chain reaction (ripple effect). The tetravalent cerium in the complex is slowly reduced into a trivalent cerium in the reductive condition of a hydrochloric acid system and finally formed into a cerium fluoride precipitate with fluorine ions.

In a case where the catalytic leaching promoter is an inorganic salt containing a tetravalent cerium, the existence of the tetravalent cerium promotes the leaching of the fluorine from minerals to facilitate the leaching of rare earths, thus improving the leaching rate of rare earths, especially the leaching of high-value elements of non-cerium rare earths.

In a case where the catalytic leaching promoter is a inorganic salt containing the fluorine element, the existence of fluorine ions facilitates the leaching of a tetravalent cerium to initiate a chain reaction (ripple effect) to promote the leaching of rare earths, tetravalent cerium and the fluorine element, then a rare earth chloride solution containing little cerium element and a cerium-rich residue containing the fluorine element are obtained, and sequentially rare earth fluorides are separated and recovered from the cerium-rich residue.

Further, in the method for recovering rare earth elements and a fluorine element in a bastnaesite treatment process, an amount of the catalytic leaching promoter is 0.01~5%, and preferably 0.1~3%, of the weight of the bastnaesite. When used in an amount within this range, the catalytic leaching promoter can form coordination ions with cerium ions, thorium ions, fluorine ions and the like in the bastnaesite to facilitate the leaching of the fluorine, the cerium and rare earths from minerals to form a chain reaction (ripple effect).

Further, in the method for recovering rare earth elements and a fluorine element in a bastnaesite treatment process, the leaching process using hydrochloric acid is carried out at 80~250° C., and preferably at 100~200° C. When the leaching process using hydrochloric acid is carried out within this temperature range, the mineral decomposition rate of bastnaesite is improved, and the coordination efficiency of the hydrochloric acid leaching promoter with cerium ions, thorium ions, fluorine ions and the like in the bastnaesite is also improved.

The advantage of the method for recovering rare earth elements and a fluorine element in a bastnaesite treatment process provided herein is described below with reference to embodiments 1~29.

Comparative Embodiment 1

Bastnaesite is oxidation roasted for 2 hr at 650° C. and leached for 8 hr by a hydrochloric acid at 95° C. to obtain a rare earth chloride solution containing little cerium element and a cerium-rich residue containing the fluorine element, wherein the total leaching rate of rare earths is 33% and that of the non-cerium rare earths contained in the bastnaesite is 80%, and the $CeO_2$/TREO content contained in the cerium-rich residue containing the fluorine element is 90% (cerium oxide and the total amount of rare earth oxides). To improve the leaching rate of high-value non-cerium rare earths, the cerium-rich residue containing the fluorine element is further processed by an alkali decomposition method, the processed cerium-rich residue containing the fluorine element is dissolved by another hydrochloric acid to generate an alkali wastewater containing the fluorine element, and the alkali wastewater needs to be processed further.

Comparative Embodiment 2

Bastnaesite containing 70% of REO is oxidation roasted for 3 hr at 600° C. and leached for 10 hr by a hydrochloric acid at 70° C., a perchloric acid is added into the bastnaesite during the leaching process by a hydrochloric acid in an amount of 10 wt % of the bastnaesite, so as to obtain a rare earth chloride solution containing little cerium element and a cerium-rich residue containing the fluorine element wherein the total leaching rate of rare earths is 45.3% and that of non-cerium rare earths contained in the bastnaesite is 82.5%.

Embodiment 1

Bastnaesite containing 65% of REO is oxidation roasted for 0.5 hr at 600° C., a sodium sulfate is added into the bastnaesite as a roasting promoter during the roasting process in an amount of 5 wt % of the bastnaesite, the roasted bastnaesite is leached for 10 hr by a hydrochloric acid at 20° C., a cerium sulfate is added into the bastnaesite as a catalytic leaching promoter during the leaching process using by the hydrochloric acid in an amount of 0.1 wt % of the bastnaesite, so as to obtain a rare earth chloride solution containing little cerium element and a cerium-rich residue containing the fluorine element, wherein the total leaching rate of rare earths is up to 72.3% and that of non-cerium rare earths contained in the bastnaesite is up to 98.5%. the $CeO_2$/TREO content in the cerium-rich residue is up to 98.4%. A hydraulic cyclone separation process is carried out for the cerium-rich residue, then rare earth fluorides is obtained and the purity of the rare earth fluorides is 96.7%, wherein the $CeO_2$/TREO content of the rare earth fluorides is greater than 98%. The total recovery rate of the rare earth entering the rare earth fluorides and rare earth chlorides is up to 98.1%. The sodium element introduced by the roasting promoter can be separated from rare earths when a solvent extraction separation processing is carried out for the rare earth chlorides.

Embodiment 2

Bastnaesite containing 65% of REO is oxidation roasted for 5 hr at 350° C., an aluminum sulfate is added into the bastnaesite as a roasting promoter during the roasting process in an amount of 0.1 wt % of the bastnaesite, the roasted bastnaesite is leached for 0.5 hr by a hydrochloric acid at 80° C., a lanthanum sulfate is added into the bastnaesite as a catalytic leaching promoter during the leaching process using hydrochloric acid in an amount of 5 wt % of the bastnaesite, so as to obtain a rare earth chloride solution containing little cerium element and a cerium-rich residue containing the fluorine element, wherein the total leaching rate of rare earths is up to 70.8% and that of non-cerium rare earths contained in the bastnaesite is up to 98.4%. The $CeO_2$/TREO content in the cerium-rich residue is up to 97.1%. After a floatation separation processing is carried out for the cerium-rich residue containing the fluorine element, rare earth fluorides is obtained and the purity of the rare earth fluorides is 96.3%. The $CeO_2$/TREO content of the rare earth fluorides is greater than 98%. The total recovery rate of the rare earth entering the rare earth fluorides and rare earth chlorides is up to 98.8%. The aluminum element introduced by the roasting promoter can be separated from rare earths when a solvent extraction separation processing is carried out for the rare earth chlorides.

Embodiment 3

Bastnaesite is oxidation roasted for 2.5 hr at 450° C., a sodium fluoride is added into the bastnaesite during the roasting process as a roasting promoter in an amount of 1 wt % of the bastnaesite, the roasted bastnaesite is leached for 5 hr by a hydrochloric acid at 50° C., an aluminum nitrate is added into the bastnaesite as a catalytic leaching promoter during the leaching process using hydrochloric acid in an amount of 2 wt % of the bastnaesite, so as to obtain a rare earth chloride solution containing little cerium element and a cerium-rich residue containing the fluorine element, wherein the total leaching rate of rare earths is up to 73.1% and that of non-cerium rare earths contained in the bastnaesite is up to 99.1%. The $CeO_2$/TREO content in the cerium-rich residue is up to 98.7%. After a magnetic separation processing is performed on the cerium-rich residue containing the fluorine element, rare earth fluorides is obtained and the purity of the rare earth fluorides is 95.3%, wherein the $CeO_2$/TREO content of the rare earth fluorides is greater than 98%. The total recovery rate of the rare earth entering the rare earth fluorides and rare earth chlorides is up to 99.2% and above. The non-rare earth elements, such as, the sodium element and the aluminum element, introduced by the roasting promoter or the catalytic leaching promoter can be separated from rare earths when a solvent extraction separation processing is carried out for the rare earth chlorides.

Embodiment 4

Bastnaesite containing 50% of REO is oxidation roasted for 3 hr at 500° C., a cerium sulfate is added into the bastnaesite as a roasting promoter during the roasting process, in an amount of 1.5 wt % of the bastnaesite, the roasted bastnaesite is leached for 6 h at 60° C. by a hydrochloric acid, a cerium nitrate is added into the bastnaesite as a catalytic leaching promoter during the leaching process using hydrochloric acid in an amount of 2.5 wt % of the bastnaesite, so as to obtain a rare earth chloride solution containing little cerium element and a cerium-rich residue containing the fluorine element. The leaching rate of rare earths is up to 76.4% and that of non-cerium rare earths contained in the bastnaesite is up to 98.7%. The $CeO_2$/TREO content in the cerium-rich residue is up to 99%. After a hydraulic cyclone separation processing is carried out for the cerium-rich residue containing the fluorine element, rare earth fluorides is obtained and the purity of the rare earth fluorides is above 96.8%, the $CeO_2$/TREO content of the rare earth fluorides is greater than 98%. The total recovery rate of rare earths entering the rare earth fluorides and rare earth chlorides is up to 99%.

Embodiment 5

Bastnaesite containing 70% of REO is oxidation roasted for 2 hr at 400° C.; a praseodymium sulfate is added into the bastnaesite during the roasting process as a roasting promoter in an amount of 3 wt % of the bastnaesite, the roasted bastnaesite is leached for 2 hr using hydrochloric acid at 60° C., a potassium fluoride is added into the bastnaesite as a catalytic leaching promoter during the leaching process by a hydrochloric acid in an amount of 1.5 wt % of the bastnaesite, so as to obtain a rare earth chloride solution containing little cerium element and a cerium-rich residue containing the fluorine element. The leaching rate of rare earths is up to 71.5% and that of non-cerium rare earths contained in the bastnaesite is up to 98.5%. The $CeO_2$/TREO content in the cerium-rich residue is up to 95%. After a hydraulic cyclone separation processing is carried out for the cerium-rich residue containing the fluorine element, rare earth fluorides is obtained and the purity of the rare earth fluorides is 97%, wherein the $CeO_2$/TREO content of the rare earth fluorides is greater than 98%. The total recovery rate of rare earths entering the rare earth fluorides and rare earth chlorides is up to 98%. The potassium element introduced by the catalytic leaching promoter can be separated from rare earths when a solvent extraction separation processing is carried out for the rare earth chlorides.

Embodiment 6

Bastnaesite is oxidation roasted for 3 hr at 400° C.; an aluminum sulfate is added into the bastnaesite during the roasting process as a roasting promoter in an amount of 2 wt % of the bastnaesite, the roasted bastnaesite is leached for 4 hr at 40° C. by a hydrochloric acid to obtain a rare earth chloride solution containing little cerium element and a cerium-rich residue containing the fluorine element. The leaching rate of rare earths is up to 71.8% and that of non-cerium rare earths contained in the bastnaesite is up to 98.6%. The $CeO_2$/TREO content in the cerium-rich residue is up to 97.3%. After a floatation separation processing is carried out for the cerium-rich residue containing the fluorine element, rare earth fluorides is obtained and the purity of the rare earth fluorides is 96%, wherein the $CeO_2$/TREO content of the rare earth fluorides is greater than 98%. The total recovery rate of rare earths entering the rare earth fluorides and rare earth chlorides is up to 99%. The aluminum element introduced by the roasting promoter can be separated from rare earths when a solvent extraction separation processing is carried out for the rare earth chlorides.

Embodiment 7

Bastnaesite is oxidation roasted for 3 hr at 500° C. and then leached at 50° C. by a hydrochloric acid, a cerium sulfate is added into the bastnaesite as a catalytic leaching promoter during the leaching process using hydrochloric acid in an amount of 2.5 wt % of the bastnaesite, so as to obtain a rare earth chloride solution containing little cerium element and a cerium-rich residue containing the fluorine element. The leaching rate of rare earths is up to 75.3% and that of non-cerium rare earths contained in the bastnaesite is up to 98.5%. The f $CeO_2$/TREO content in the cerium-rich residue is up to 98%. Rare earth fluorides is obtained and the purity of the rare earth fluorides is 95.8% after a hydraulic cyclone separation processing is carried out for the cerium-rich residue containing the fluorine element, wherein the $CeO_2$/TREO content of the rare earth fluorides is greater than 98%. The total recovery rate of rare earths entering the rare earth fluorides and rare earth chlorides is up to 99%.

Embodiments 8-14

In embodiments 8-14, the method for recovering rare earth elements and a fluorine element in a bastnaesite treatment process is the same as that of embodiment 7, and the raw materials of the catalytic leaching promoters used in embodiments 7-14 and the proportions thereof are shown in the following Table 1.

The leaching rate of rare earths (A %), the leaching rate of the non-cerium rare earths in the bastnaesite (B %), and the $CeO_2$/TREO content (C %) of cerium-rich residue containing the fluorine element are shown in Table 2.

TABLE 1

| | Catalytic leaching promoter | |
|---|---|---|
| | Raw material | Amount |
| Embodiment 7 | Cerium sulfate | 2.5 wt % |
| Embodiment 8 | Ammonium ceric nitrate (mass ratio: 1:1) | 2.5 wt % |
| Embodiment 9 | Sodium sulfate, potassium sulfate (mass ratio: 1:1) | 2.5 wt % |
| Embodiment 10 | Cerium sulfate, aluminum chloride (mass ratio: 1:1) | 2.5 wt % |
| Embodiment 11 | Magnesium sulfate, aluminum sulfate (mass ratio: 1:1) | 2.5 wt % |
| Embodiment 12 | Cerium(IV) nitrate, aluminum nitrate (mass ratio: 1:1) | 2.5 wt % |
| Embodiment 13 | Potassium fluoride, ammonium fluoride (mass ratio: 1:1) | 2.5 wt % |
| Embodiment 14 | Sodium fluoride, aluminum fluoride (mass ratio: 1:1) | 2.5 wt % |

TABLE 2

| | A | B | C |
|---|---|---|---|
| Embodiment 7 | 75.3 | 98.5 | 98 |
| Embodiment 8 | 72.5 | 98.1 | 96.8 |
| Embodiment 9 | 71 | 98.2 | 96.6 |
| Embodiment 10 | 71.7 | 98.5 | 96.8 |

TABLE 2-continued

|  | A | B | C |
| --- | --- | --- | --- |
| Embodiment 11 | 75.6 | 99.3 | 99 |
| Embodiment 12 | 75.6 | 99.2 | 98.9 |
| Embodiment 13 | 74.2 | 98.7 | 97.5 |
| Embodiment 14 | 74.8 | 98.6 | 97.4 |

It can be seen from Tables 1 and 2 that the addition of a catalytic leaching promoter in a hydrochloric acid leaching step realizes the comprehensive utilization of a fluorine resource and achieves the high recovery rate of rare earths, especially the recovery rate of high-value non-cerium rare earths; the cerium sulfate, the aluminum sulfate, the magnesium sulfate, cerium(IV) nitrate and the aluminum nitrate used in embodiments 7, 11 and 12, which are structurally stable and hardly form rare earth sodium sulfate double sulfate precipitation with rare earths, achieve a better effect than the ceric nitrate, the sodium sulfate, the potassium sulfate, the ammonium sulfate and the aluminum chloride used in embodiments 8-10. Meanwhile, the potassium fluoride, the ammonium fluoride, the sodium fluoride and the aluminum fluoride used in embodiments 13 and 14 as a catalytic leaching promoter also achieve an excellent effect, as potassium fluoride is expensive and the use of ammonium fluoride may lead to the generation of ammonia-nitrogen wastewater, sodium fluoride and aluminum fluoride are preferred.

Similarly, either the addition of the foregoing promoters merely in a roasting step or the addition of the foregoing promoters in both a roasting step and a leaching step realizes the comprehensive utilization of a fluorine resource and achieves the high recovery rate of rare earths, especially the recovery rate of high-value non-cerium rare earths. Cerium sulfate, aluminum sulfate, magnesium sulfate, cerium(IV) nitrate and aluminum nitrate, which are structurally stable and hardly form rare earth sodium sulfate double sulfate precipitation with rare earths, achieve a better effect than ammonium ceric nitrate, sodium sulfate, potassium sulfate, ammonium sulfate and aluminum chloride. Potassium fluoride, ammonium fluoride, sodium fluoride and aluminum fluoride also achieve an excellent effect, as potassium fluoride is expensive and the use of ammonium fluoride may lead to the generation of ammonia-nitrogen wastewater, sodium fluoride and aluminum fluoride are preferably.

Embodiment 15

Bastnaesite is oxidation roasted for 1 hr at 350° C., a aluminum sulfate and a cerium nitrate (in a mass ratio of 1:2) are added into the bastnaesite as a roasting promoter during the roasting process in an amount of 0.01 wt % of the bastnaesite, the roasted bastnaesite is leached for 3 hr by a hydrochloric acid at 35° C. and a magnesium sulfate and a cerium sulfate (in a mass ratio of 1:2) are added into the bastnaesite as a catalytic leaching promoter during the leaching process using hydrochloric acid in an amount of 0.1 wt % of the bastnaesite, so as to obtain a rare earth chloride solution containing little cerium element and a cerium-rich residue containing the fluorine element, wherein the leaching rate of rare earths is up to 72.9% and that of non-cerium rare earths contained in the bastnaesite is up to 98.7%. The $CeO_2$/TREO content in the cerium-rich residue is up to 97.6%.

Embodiment 16

Bastnaesite is oxidation roasted for 1 hr at 350° C., a cerium sulfate and a cerium nitrate (in a mass ratio of 2:1) are added into the bastnaesite as a roasting promoter during the roasting process in an amount of 0.01 wt % of the bastnaesite, the roasted bastnaesite is leached for 3 hr by a hydrochloric acid at 35° C. and an aluminum nitrate and a cerium sulfate (in a mass ratio of 2:1) are added into the bastnaesite as a catalytic leaching promoter during the leaching process using hydrochloric acid in an amount of 0.1 wt % of the bastnaesite, so as to obtain a rare earth chloride solution containing little cerium element and a cerium-rich residue containing the fluorine element, wherein the leaching rate of rare earths is up to 73.2%, and that of non-cerium rare earths contained in the bastnaesite is up to 98.7%. The $CeO_2$/TREO content in the cerium-rich residue is up to 97.5%.

Embodiment 17

Bastnaesite containing 50% of REO is leached for 5 hr by a hydrochloric acid at 80° C., a sodium sulfate is added into the bastnaesite as a catalytic leaching promoter during the leaching process using hydrochloric acid in an amount of 0.01 wt % of the bastnaesite, so as to obtain a rare earth chloride solution containing little cerium element and a cerium-rich residue containing the fluorine element. The leaching rate of rare earths is up to 70.1% and that of non-cerium rare earths contained in the bastnaesite is up to 98%. The $CeO_2$/TREO content in the cerium-rich residue is up to 95%.

Embodiment 18

Bastnaesite containing 50% of REO is leached for 8 hr by a hydrochloric acid at 80° C., an aluminum nitrate is added into the bastnaesite as a catalytic leaching promoter during the leaching process using by the hydrochloric acid in an amount of 0.01 wt % of the bastnaesite, so as to obtain a rare earth chloride solution containing little cerium element and a cerium-rich residue containing the fluorine element. The leaching rate of rare earths is up to 71.5% and that of non-cerium rare earths contained in the bastnaesite is up to 98.4%. The $CeO_2$/TREO content in the cerium-rich residue is up to 96.2%.

Embodiment 19

Bastnaesite containing 30% of REO is leached for 3 hr by a hydrochloric acid at 100° C., an aluminum sulfate is added into the bastnaesite as a catalytic leaching promoter during the leaching process using hydrochloric acid in an amount of 0.1 wt % of the bastnaesite, so as to obtain a rare earth chloride solution containing little cerium element and a cerium-rich residue containing the fluorine element. The leaching rate of rare earths is up to 74% and that of non-cerium rare earths contained in the bastnaesite is up to 98.3%. The $CeO_2$/TREO content in the cerium-rich residue is up to 97.2%.

Embodiment 20

Bastnaesite containing 30% of REO is leached for 7 hr by a hydrochloric acid at 150° C., an aluminum sulfate is added into the bastnaesite as a catalytic leaching promoter during the leaching process using hydrochloric acid in an amount of 0.1 wt % of the bastnaesite, so as to obtain a rare earth chloride solution containing little cerium element and cerium-rich residue containing the fluorine element. The leaching rate of rare earths is up to 74.1% and that of non-cerium rare earths contained in the bastnaesite is up to 98.4%. T The CeO$_2$/TREO content in the cerium-rich residue is up to 97.3%.

Embodiment 21

Bastnaesite containing 80% of REO is leached for 1 hr by a hydrochloric acid at 200° C., an aluminum nitrate is added into the bastnaesite as a catalytic leaching promoter during the leaching process using hydrochloric acid in an amount of 3 wt % of the bastnaesite, so as to obtain a rare earth chloride solution containing little cerium element and a cerium-rich residue containing the fluorine element. The leaching rate of rare earths is up to 74.2% and that of non-cerium rare earths contained in the bastnaesite is up to 98.5%. The CeO$_2$/TREO content in the cerium-rich residue is up to 97.4%.

Embodiment 22

Bastnaesite containing 65% of REO is leached for 3 hr by a hydrochloric acid at 220° C., a cerium nitrate is added into the bastnaesite as a catalytic leaching promoter during the leaching process using hydrochloric acid in an amount of 1 wt % of the bastnaesite, so as to obtain a rare earth chloride solution containing little cerium element and a cerium-rich residue containing the fluorine element. The leaching rate of rare earths is up to 73.7% and that of non-cerium rare earths contained in the bastnaesite is up to 98.3%. The CeO$_2$/TREO content in the cerium-rich residue is up to 96.8%.

Embodiment 23

Bastnaesite containing 80% of REO is leached for 1 hr by a hydrochloric acid at 250° C., a potassium fluoride is added into the bastnaesite as a catalytic leaching promoter during the leaching process using hydrochloric acid in an amount of 5 wt % of the bastnaesite, so as to obtain a rare earth chloride solution containing little cerium element and a cerium-rich residue containing the fluorine element. The leaching rate of rare earths is up to 70.7% and that of non-cerium rare earths contained in the bastnaesite is up to 98%. The CeO$_2$/TREO content in the cerium-rich residue is up to 96.5%.

Embodiments 24~29

In embodiments 24~29, the method for recovering rare earth elements and a fluorine element in a bastnaesite treatment process is the same as that of embodiment 21, and the raw materials of the roasting promoters and the catalytic leaching promoters used in embodiments 21, 24~29 and the proportions thereof are shown in the following table 3.

The leaching rate of rare earths (A %), the leaching rate of the non-cerium rare earths in bastnaesite (B %), and the CeO$_2$/TREO content (C %) of cerium-rich residue containing the fluorine element are shown in Table 4

TABLE 3

| | Catalytic leaching promoter | |
|---|---|---|
| | Raw material | amount |
| Embodiment 21 | Aluminum nitrate | 3 wt % |
| Embodiment 24 | Aluminum chloride | 3 wt % |
| Embodiment 25 | Potassium sulfate, sodium sulfate (in a mass ratio of 1:3) | 3 wt % |
| Embodiment 26 | Aluminum nitrate, aluminum sulfate (in a mass ratio of 1:3) | 3 wt % |

TABLE 3-continued

| | Catalytic leaching promoter | |
|---|---|---|
| | Raw material | amount |
| Embodiment 27 | Cerium nitrate, magnesium sulfate (in a mass ratio of 1:3) | 3 wt % |
| Embodiment 28 | Potassium fluoride, ammonium fluoride (in a mass ratio of 1:3) | 3 wt % |
| Embodiment 29 | Sodium fluoride, aluminum fluoride (in a mass ratio of 1:3) | 3 wt % |

TABLE 4

| | A | B | C |
|---|---|---|---|
| Embodiment 21 | 74.2 | 98.5 | 97 |
| Embodiment 24 | 71.1 | 98.1 | 96.5 |
| Embodiment 25 | 70.8 | 98.1 | 96.6 |
| Embodiment 26 | 74.4 | 98.5 | 97.2 |
| Embodiment 27 | 74.1 | 98.4 | 97 |
| Embodiment 28 | 73 | 98.2 | 96.8 |
| Embodiment 29 | 73.3 | 98.3 | 96.9 |

It can be seen from Tables 3 and 4 that the addition of a catalytic leaching promoter in a hydrochloric acid leaching step realizes the comprehensive utilization of a fluorine resource and achieves the high recovery rate of rare earths, especially the recovery rate of high-value non-cerium rare earths. The cerium sulfate, the aluminum sulfate, the magnesium sulfate, the cerium(IV) nitrate and the aluminum nitrate used in embodiments 21, 26 and 27, which are structurally stable and hardly form rare earth sodium sulfate double sulfate precipitation with rare earth, achieve a better effect than the ammonium ceric nitrate, the sodium sulfate, the potassium sulfate, the ammonium sulfate and the aluminum chloride used in embodiments 24 and 25. Meanwhile, the potassium fluoride, the ammonium fluoride, the sodium fluoride and the aluminum fluoride used in embodiments 28 and 29 as a catalytic leaching promoter also achieve an excellent effect, as potassium fluoride is expensive and the use of ammonium fluoride may lead to the generation of ammonia-nitrogen wastewater, sodium fluoride and aluminum fluoride are preferred.

The mentioned above is only preferred embodiments of the invention but not limitation to the invention, it should be appreciated that various modification and variations can be devised by those of ordinary skill in the art. Any modification, substitute or improvement devised without departing from the spirit and scope of the invention should fall within the protection range of the invention.

The invention claimed is:
1. A method for recovering rare earth elements and fluorine element in a bastnaesite treatment process, wherein the method comprises:
  oxidation roasting bastnaesite to obtain a roasted mixture, and leaching the roasted mixture with hydrochloric acid,
  adding a roasting promoter to the bastnaesite during the oxidation roasting; and
  adding a catalytic leaching promoter to the mixture during the leaching with hydrochloric acid;
  obtaining a rare earth chloride solution containing little cerium element and a cerium-rich residue containing the fluorine element; and
  separating and recovering rare earth fluorides from the cerium-rich residue;

wherein the catalytic leaching promoter is at least one selected from the group consisting of magnesium sulfate, ammonium sulfate, a rare earth sulfate, ammonium ceric nitrate, cerium(IV) nitrate, aluminum nitrate, aluminum chloride, aluminum sulfate, sodium fluoride, potassium fluoride, ammonium fluoride and aluminum fluoride;

or the method for recovering rare earth elements and fluorine element in a bastnaesite treatment process, comprising:

oxidation roasting bastnaesite to obtain a roasted mixture, and leaching the roasted mixture with hydrochloric acid, adding a catalytic leaching promoter to the mixture during the leaching with hydrochloric acid;

obtaining a rare earth chloride solution containing little cerium element and a cerium-rich residue containing the fluorine element; and separating and recovering rare earth fluorides from the cerium-rich residue;

wherein the catalytic leaching promoter is at least one selected from the group consisting of magnesium sulfate, ammonium sulfate, a rare earth sulfate, ammonium ceric nitrate, cerium(IV) nitrate, aluminum nitrate, aluminum chloride, aluminum sulfate, sodium fluoride, potassium fluoride, ammonium fluoride and aluminum fluoride.

2. The method for recovering rare earth elements and fluorine element in a bastnaesite treatment process according to claim 1, wherein the roasting promoter is at least one selected from the group consisting of sodium sulfate, potassium sulfate, magnesium sulfate, ammonium sulfate, aluminum sulfate, a rare earth sulfate, ammonium eerie nitrate, cerium (IV) nitrate, aluminum nitrate, aluminum chloride, sodium fluoride, potassium fluoride, ammonium fluoride and aluminum fluoride.

3. The method for recovering rare earth elements and fluorine element in a bastnaesite treatment process according to claim 2, wherein the rare earth sulfates includes cerium sulfate.

4. The method for comprehensively recovering rare earth elements and fluorine element in a bastnaesite treatment process according to claim 1, wherein an amount of the roasting promoter is 0.01~5% by weight of the bastnaesite.

5. The method for recovering rare earth elements and fluorine element in a bastnaesite treatment process according to claim 1, wherein an amount of the catalytic leaching promoter is 0.01~5% by weight of the bastnaesite.

6. The method for recovering rare earth elements and fluorine element in a bastnaesite treatment process according to claim 1, wherein the bastnaesite is oxidation roasted for 0.5~5 hr at a controlled temperature of 350~600° C.

7. The method for recovering rare earth elements and fluorine element in a bastnaesite treatment process according to claim 1, wherein the leaching with hydrochloric acid is carried out at 20~80° C.

8. The method for recovering rare earth elements and fluorine element in a bastnaesite treatment process according to claim 4, wherein an amount of the roasting promoter is 0.1~3% by weight of the bastnaesite.

9. The method for recovering rare earth elements and fluorine element in a bastnaesite treatment process according to claim 5, wherein an amount of the catalytic leaching promoter is 0.1~3% by weight of the bastnaesite.

10. The method for recovering rare earth elements and fluorine element in a bastnaesite treatment process according to claim 6, wherein the bastnaesite is oxidation roasted for 1~5 hr at a controlled temperature of 400~500° C.

11. The method for recovering rare earth elements and fluorine element in a bastnaesite treatment process according to claim 7, wherein the leaching process using the hydrochloric acid is carried out at 35~50° C.

12. The method for recovering rare earth elements and fluorine element in a bastnaesite treatment process according to claim 1, wherein the rare earth sulfate is cerium sulfate.

13. A method for recovering rare earth elements and fluorine element in a bastnaesite treatment process, wherein the method comprises:

leaching bastnaesite with hydrochloric acid;

adding a catalytic leaching promoter during the leaching with hydrochloric acid;

obtaining a rare earth chloride solution containing little cerium element and a cerium-rich residue containing the fluorine element; and recovering rare earth fluorides from the cerium-rich residue;

wherein the catalytic leaching promoter is at least one selected from the group consisting of magnesium sulfate, ammonium sulfate, a rare earth sulfate, ammonium eerie nitrate, cerium (IV) nitrate, aluminum nitrate, aluminum chloride, aluminum sulfate, sodium fluoride, potassium fluoride, ammonium fluoride and aluminum fluoride.

14. The method for recovering rare earth elements and fluorine element in a bastnaesite treatment process according to claim 13, wherein an amount of the catalytic leaching promoter is 0.01~5% by weight of the bastnaesite.

15. The method for recovering rare earth elements and fluorine element in a bastnaesite treatment process according to claim 13, wherein the leaching process using the hydrochloric acid is carried out at 80~250° C.

16. The method for recovering rare earth elements and fluorine element in a bastnaesite treatment process according to claim 14, wherein an amount of the catalytic leaching promoter is 0.1~3% by weight of the bastnaesite.

17. The method for recovering rare earth elements and fluorine element in a bastnaesite treatment process according to claim 15, wherein the leaching process using the hydrochloric acid is carried out at 100~200° C.

18. The method for recovering rare earth elements and fluorine element in a bastnaesite treatment process according to claim 13, wherein the rare earth sulfate is cerium sulfate.

* * * * *